(12) United States Patent
Tillotson et al.

(10) Patent No.: US 8,788,119 B2
(45) Date of Patent: Jul. 22, 2014

(54) UNMANNED VEHICLE AND SYSTEM

(75) Inventors: Brian J. Tillotson, Kent, WA (US);
Tamaira E. Ross, Seattle, WA (US);
John L. Vian, Renton, WA (US)

(73) Assignee: The Boeing Company, Chicago, IL (US)

( * ) Notice: Subject to any disclaimer, the term of this patent is extended or adjusted under 35 U.S.C. 154(b) by 827 days.

(21) Appl. No.: 12/964,500

(22) Filed: Dec. 9, 2010

(65) Prior Publication Data
US 2012/0150364 A1    Jun. 14, 2012

(51) Int. Cl.
*G01C 23/00*    (2006.01)

(52) U.S. Cl.
USPC .......................................................... 701/3

(58) Field of Classification Search
None
See application file for complete search history.

(56) References Cited

U.S. PATENT DOCUMENTS

| | | | |
|---|---|---|---|
| 5,503,350 A | 4/1996 | Foote | |
| 6,792,259 B1 | 9/2004 | Parise | |
| 7,711,441 B2 | 5/2010 | Tillotson | |
| 7,813,888 B2 | 10/2010 | Vian et al. | |
| 8,115,665 B2 * | 2/2012 | Zahavi | 342/13 |
| 2005/0103943 A1 | 5/2005 | Tanielian | |
| 2008/0017239 A1 | 1/2008 | Tillotson | |
| 2009/0251354 A1 * | 10/2009 | Zahavi | 342/20 |
| 2010/0138173 A1 | 6/2010 | Tillotson | |
| 2010/0268409 A1 | 10/2010 | Vian et al. | |
| 2011/0226174 A1 * | 9/2011 | Parks | 114/313 |
| 2011/0266995 A1 * | 11/2011 | Winfield et al. | 320/103 |

FOREIGN PATENT DOCUMENTS

EP     0913908 A2    5/1999

OTHER PUBLICATIONS

International Search Report and Written Opinion of PCT/2011/053133; Jan. 19, 2012; 10 pages.
http://www.friendsofcrc.ca/Projects/Sharp/sharp.html.
http://www.kurasc.kyoto-u.ac.jp/plasma-group/sps/milax-e.html.
http://www.nasa.gov/centers/dryden/news/FactSheets/FS-087-DFRC.html.
http://www.spaceelevatorgames.org/.
http://www.nasa.gov/centers/dryden/status_reports/power_beam.html.
http://cde.cerosmedia.com/1Y4c74d235ccb52742.cde, p. 12.
http://www.lightcrafttechnologies.com/technology.html.
http://www.lasermotive.com/blog/.
http://www.youtube.com/watch?v=2ABVGHypirQ.
http://www.pfrr.alaska.edu/ASGP/Alaska/UA/ASGP/Saber.htm.

* cited by examiner

*Primary Examiner* — Thomas Tarcza
*Assistant Examiner* — Adam Alharbi
(74) *Attorney, Agent, or Firm* — Armstrong Teasdale LLP

(57) ABSTRACT

An unmanned vehicle is provided. The unmanned vehicle includes a navigation system configured to navigate the unmanned vehicle relative to a beam of energy emitted from a beam source, a power receiver configured to receive energy from the beam, and an energy storage system configured to store received energy for use in selectively powering the unmanned vehicle.

17 Claims, 5 Drawing Sheets

UNMANNED VEHICLE AND SYSTEM

BACKGROUND

The field of the disclosure relates generally to unmanned vehicles and more particularly to powered unmanned aerial vehicles.

Unmanned vehicles require energy to operate, and are periodically refueled, repaired, and maintained to continue operating. To increase the availability of unmanned vehicles, it is desirable to minimize the time for ingress/egress, refueling, maintenance, and repair. Beamed power systems may eliminate the need for a vehicle to return to base for refueling or recharging. Moreover, in the case of an unmanned aerial vehicle (UAV), beamed power systems can also reduce landing/takeoff cycles. Thus, beamed power systems can reduce the amount of maintenance and repair for a UAV.

However, the use of known beamed power systems may be limited. At least some known beamed power systems direct a beam at an unmanned vehicle while it is moving, and as such move the beam to follow the movement of the vehicle. Beam steering generally requires precise, complex moving components for optical systems or mechanically-steered microwave systems, and complex, expensive electronics for phased array microwave systems. Such steering systems add costs, weight, vulnerability, and complexity to a beamed power system.

At least some other known beamed power systems include a fixed beam source and a vehicle that is coupled to a set of wires or rails that constrain the movement of the vehicle to ensure it remains positioned within the beam. However, because the vehicle is unable to move away from the beam, use of such systems is limited. Other known systems use a fixed beam source to illuminate a vehicle that is not physically tethered with wires or rails. However, in such systems, the vehicle has a propulsive geometry, i.e., predetermined optics and aerodynamics, which ensures the vehicle remains centered in the beam. Again, such systems are limited as the vehicle is unable to move outside of, or operate outside of the beam.

BRIEF DESCRIPTION

In one embodiment, an unmanned vehicle is provided. The unmanned vehicle includes a navigation system configured to navigate the unmanned vehicle relative to a beam of energy emitted from a beam source, a power receiver configured to receive energy from the beam, and an energy storage system configured to store received energy for use in selectively powering the unmanned vehicle.

In another embodiment, a vehicle system is provided. The vehicle system includes a beam source configured to emit a beam of energy, and an unmanned vehicle comprising a navigation system, a power receiver, and an energy storage system, the navigation system configured to position the unmanned vehicle relative to the beam, the power receiver configured to receive energy from the beam, the energy storage system configured to store the received energy for use in powering the unmanned vehicle.

DETAILED DESCRIPTION

The systems described herein overcome at least some of the disadvantages of known beamed power systems. More specifically, the systems described herein provide a beamed power system that has decreased costs, weight, complexity, and maintenance requirements associated with known beamed power systems. In addition, the systems described herein also provide a beam source that may be mounted and operated from a plurality of different platforms and in a plurality of different environments.

Figure 1:
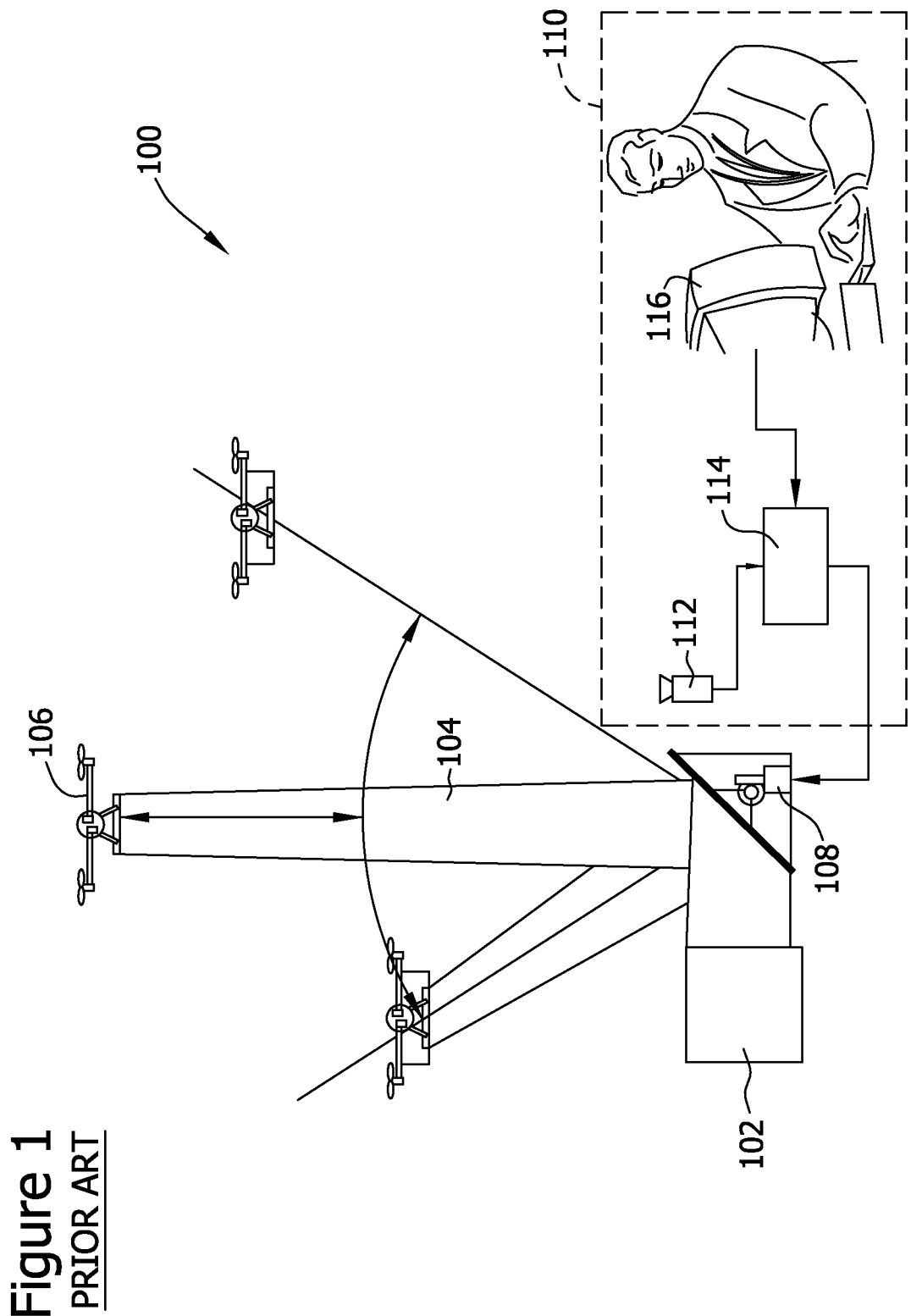
FIG. 1 is a schematic diagram of an exemplary known beamed power system.

FIG. 1 is a schematic diagram of an exemplary known beamed power system 100. In the exemplary embodiment, beamed power system 100 includes a beam source 102, a beam 104, an unmanned vehicle 106, a steering mirror 108, and a control system 110. Control system 110 includes a position sensor 112, a controller 114, and an operator control interface 116. During use, control system 110 manipulates steering mirror 108 to change a relative direction of beam 104 emitted from beam source 102. Position sensor 112 can detect a position of unmanned vehicle 106 and manipulate steering mirror 108 to enable beam 104 to be emitted towards unmanned vehicle 106. Steering mirror 108 can rotate beam 104 to track unmanned vehicle 106 through an angular range, as well as adjust a focal distance of beam 104 to maintain proper intensity on unmanned vehicle 106 as a distance of separation between unmanned vehicle 106 and beam source 102 changes. Notably, beamed power system 100 requires sophisticated electronic and mechanical components to operate properly.

Figure 2:
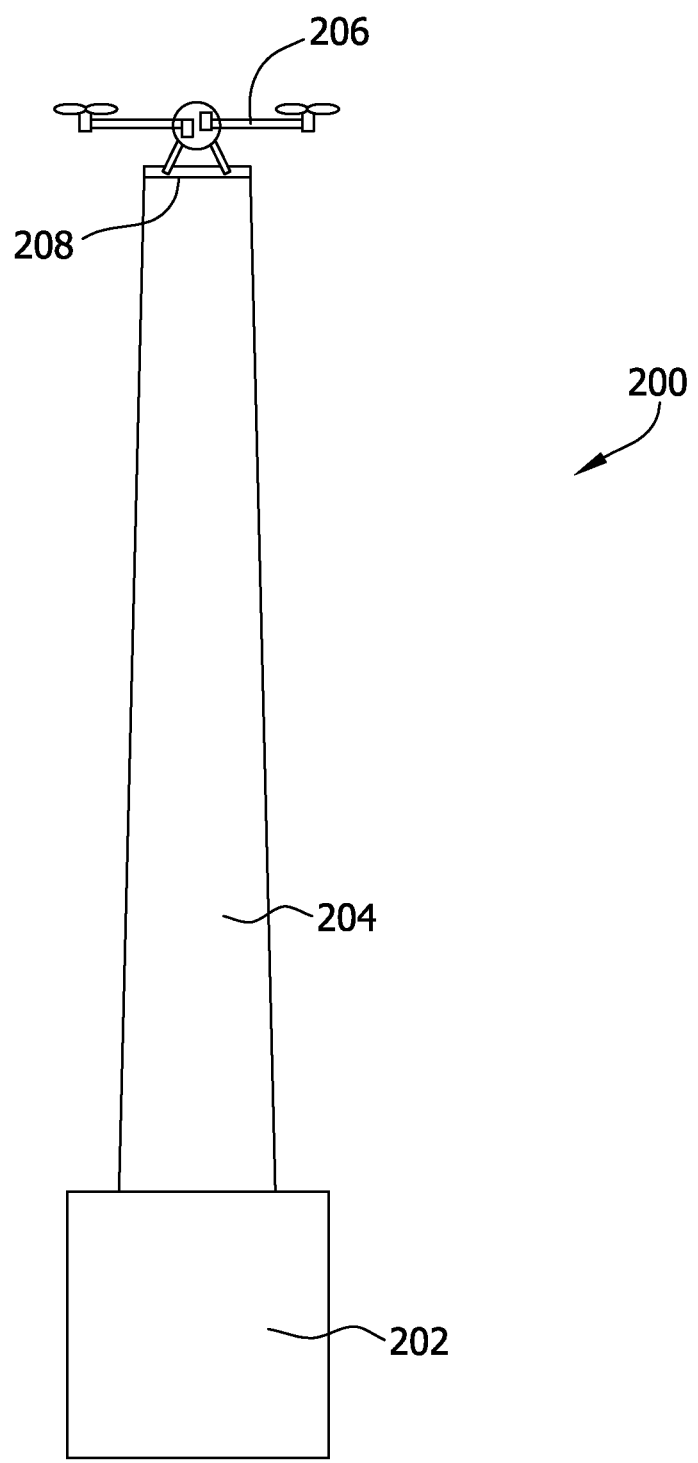
FIG. 2 is a schematic diagram of an exemplary beamed power system.

FIG. 2 is a schematic diagram of an exemplary beamed power system 200. In the exemplary embodiment, beamed power system 200 includes a beam source 202, a beam 204, and an unmanned vehicle 206. In an exemplary embodiment, unmanned vehicle 206 is an unmanned aerial vehicle (UAV). In another embodiment, unmanned vehicle 206 may be a vertical take off and landing (VTOL) UAV. Alternatively, unmanned vehicle 206 may be any type of unmanned vehicle capable of functioning as described herein, including, but not limited to, an airship, a fixed wing UAV, a ground vehicle, or a water surface vehicle (not shown).

In the exemplary embodiment, beam source 202 emits a beam 204. Beam 204 is a beam of energy. In the exemplary embodiment, beam source 202 is fixed in position, such that beam source 202 and beam 204 do not track or move with unmanned vehicle 206. Moreover, in the exemplary embodiment, beam source 202 has a fixed focal length. In alternative embodiments, the direction of beam 204 is adjustable and/or beam source 202 may include at least one optical element, such as a lens or concave mirror that enables beam 204 to be expanded or focused at a finite distance.

In the exemplary embodiment, beam source 202 converts a source of energy into a relatively narrow electromagnetic beam 204 that is emitted in a fixed direction that is suitable for access by unmanned vehicle 206. In one embodiment, beam source 202 is coupled to an electrical source of energy. In alternate embodiments, any suitable power source can be used to power beam source 202.

In the exemplary embodiment, beam source 202 is directed upward, such that beam 204 is emitted substantially vertically. Alternatively, beam source 202 is selectively adjustable to enable beam 204 to be emitted in any direction that enables beamed power system 200 to function as described herein. Moreover, in the exemplary embodiment, beam source 202 is mounted on a stationary ground platform. In alternative embodiments, beam source 202 is coupled to a structure or movable vehicle.

In different aspects, different types of electromagnetic energy are emitted from beam source 202 to power unmanned vehicle 206. In each aspect, the type of electromagnetic energy emitted matches the type of electromagnetic energy that unmanned vehicle 206 is configured to receive and store, as described in more detail below. As such, in the exemplary embodiment, unmanned vehicle 206 includes a power receiver 208 that receives electromagnetic energy emitted from beam source 202. For example, in one embodiment, power receiver 208 is a photovoltaic receiver.

In one embodiment, beam source 202 uses a laser or another monochromatic light source tuned to substantially match a photovoltaic band gap of power receiver 208 on unmanned vehicle 206. The light source can be chosen to facilitate maximizing the efficiency of photovoltaic conversion to electricity. Alternatively, the light source can be chosen to optimize the beam brightness, thus facilitating maximizing the range at which the beam remains narrow and intense.

In the exemplary embodiment, beam source 202 is transmitted using a monochromatic light source. Those of ordinary skill in the art will appreciate that in other embodiments, other types of beam sources can be used. For example, one alternative embodiment uses a broad-spectrum beam of visible light (such as a halogen lamp or a searchlight). Other embodiments may use a microwave beam to maximize end-to-end power conversion efficiency or reduce the observability of beamed power system 200.

Beam source 202 focuses beam 204 to create a region of intensity at a fixed, finite distance from beam source 202. In one embodiment, beam source 202 includes multiple individual beam sources that are positioned and oriented to enable their individual beams to intersect to create the region of intensity at the fixed, finite distance from beam source 202. Moreover, in one embodiment, beam source 202 creates a region of intensity at a location where the cross section of beam 204 substantially matches the layout of power receiver 208. For example, if a power receiver 208 within unmanned vehicle 206 is a rectangular photovoltaic array, beam source 202 may project a beam 204 that has a substantially rectangular shape near its region of intensity. Alternatively, if power receiver 208 has a circular array, beam source may be configured to a project a beam 204 that has a substantially circular shape near its region of intensity. In the exemplary embodiment, unmanned vehicle 206 is configured to align power receiver 208 with the region of intensity of beam source 202, as described in more detail below.

Figure 3:
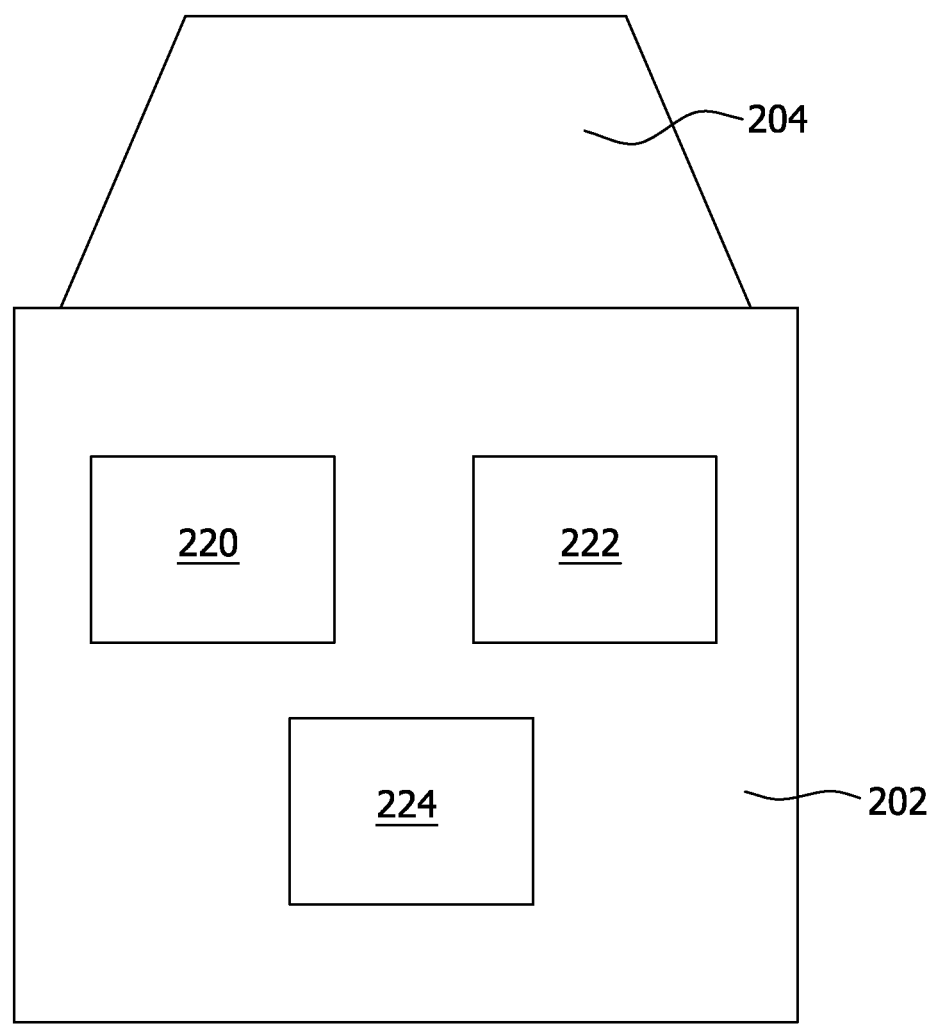
FIG. 3 is a schematic diagram of an exemplary beam source, which may be used in the beamed power system shown in FIG. 2.

FIG. 3 is a schematic diagram of an exemplary beam source 202 that may be used with the beamed power system 200 shown in FIG. 2. In the exemplary embodiment, beam source 202 includes a locating system 220, a position reference system 222, and a proximity activation system 224.

In the exemplary embodiment, locating system 220 aids unmanned vehicle 206 in locating beam 204 when unmanned vehicle 206 is positioned at a distance from beam source 202. In one embodiment, locating system 220 includes a global positioning system (GPS) that enables the location of beam source 202 to be determined, and a radio that transmits the location of beam source 202 to unmanned vehicle 206. Alternatively, locating system 220 can include any other locating system that enables beamed power system 200 to function as described herein.

In the exemplary embodiment, beam source 202 also includes a position reference system 222 that assists unmanned vehicle 206 in centering itself in beam 204 once unmanned vehicle 206 is within a predetermined proximity to beam source 202. In one exemplary embodiment, position reference system 222 transmits a local reference signal such as differential GPS (DGPS). Alternatively, position reference system 222 can include a set of object features (not shown) that are visible to a camera carried by unmanned vehicle 206.

Beam source 202 also includes a proximity activation system 224 that activates beam source 202 when unmanned vehicle 206 is within a predefined proximity to beam source 202. Accordingly, proximity activation system 224 is capable of determining whether or not unmanned vehicle 206 is within a predefined distance from beam 204. Using proximity activation system 224, beam source 202 may be selectively energized, depending on a location of unmanned vehicle 206 relative to beam source 202. Alternatively, rather than being deenergized, beam source 202 may switch to a reduced power mode of operation when unmanned vehicle 206 is outside of a predefined proximity. In one embodiment, proximity activation system 224 includes an acoustic sensor that recognizes a sound emitted by unmanned vehicle 206. Alternatively, proximity activation system 224 may include a visual sensor that recognizes the appearance of unmanned vehicle 206, and/or a radio that receives positional data from unmanned vehicle 206.

Figure 4:
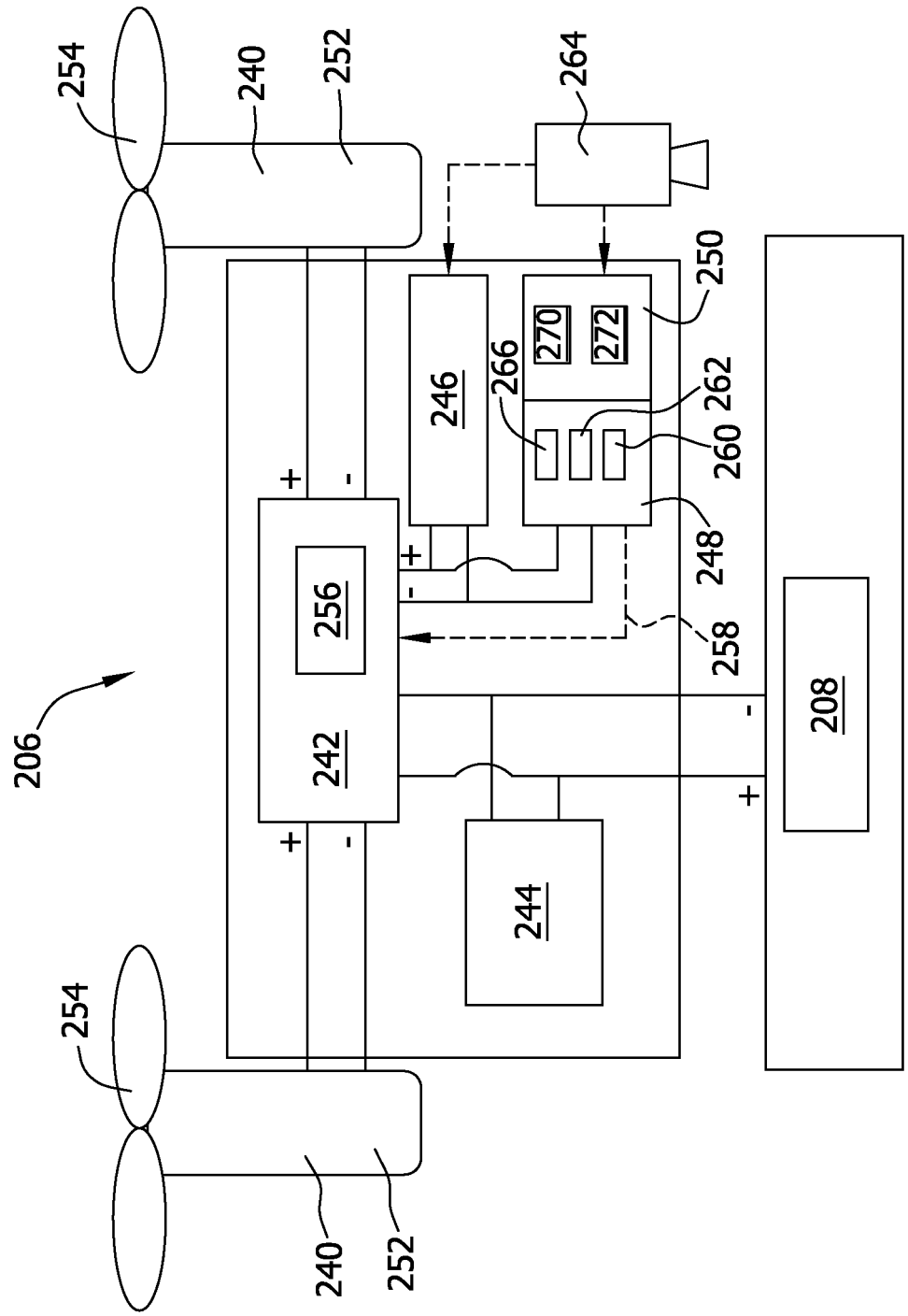
FIG. 4 is a schematic diagram of an exemplary unmanned vehicle, which may be used in the beamed power system shown in FIG. 2.

FIG. 4 is a schematic diagram of an exemplary unmanned vehicle 206 that may be used with the beamed power system 200 shown in FIG. 2. In the exemplary embodiment, unmanned vehicle 206 is a vertical take off and landing (VTOL) unmanned aerial vehicle (UAV). However, in alternative embodiments, unmanned vehicle 206 may be a different type of UAV, a ground vehicle, or a water surface vehicle. For at least some embodiments where unmanned vehicle 206 is a UAV, unmanned vehicle 206 is capable of hovering in beam 204. In one embodiment, unmanned vehicle 206 is a fixed wing UAV that has a high enough thrust-to-weight ratio that enables unmanned vehicle 206 to climb vertically and essentially "hang" from its propeller to remain in a substantially fixed position relative to beam 204.

In the exemplary embodiment, unmanned vehicle 206 includes a vehicle propulsion system 240, a control system 242, power receiver 208, an energy storage system 244, one or more payload systems 246, a navigation system 248, and a position control system 250, each of which is described in more detail below. While many embodiments described herein involve interactions between unmanned vehicle 206 and beam 204, those skilled in the art will appreciate that unmanned vehicle 206, as described herein, is also capable of launching and operating when no beam source is available.

Vehicle propulsion system 240 is used to change or maintain a relative position of unmanned vehicle 206. In the exemplary embodiment, vehicle propulsion system 240 includes at least one motor 252 that is coupled to at least one positioning device 254. In the exemplary embodiment, positioning device 254 is a propeller. Alternatively, positioning device 254 may be any device capable of changing a position of unmanned vehicle 206, including, but not limited to, a wheel, a tread, a wing, and/or any device that enables vehicle propulsion system 240 and unmanned vehicle 206 to function as described herein.

Control system 242 controls the operation of vehicle propulsion system 240. To change or maintain the relative position of unmanned vehicle 206, control system 242 communicates with motor 252 to operate positioning device 254. In the exemplary embodiment, control system includes a power management and distribution (PMAD) system 256 that allocates and routes power to vehicle propulsion system 240, power receiver 208, energy storage system 244, payload systems 246, navigation system 248, and/or position control system 250 for operation of unmanned vehicle 206. PMAD system 256 also regulates voltage and/or current output from power receiver 208 to other components of unmanned vehicle 206, and this protects other components from voltage fluctuations or surges in power. Control system 242 may also receive commands 258 from navigation system 248 and/or position control system 250, and in response, may instruct vehicle propulsion system 240 to operate accordingly.

Power receiver 208 receives energy from beam 204 and converts it to a form of energy used to power unmanned vehicle 206. For example, in the exemplary embodiment, power receiver 208 converts energy from beam 204 into electricity. In one aspect, beam source 202 emits a laser or other visible light source, and power receiver 208 is a photovoltaic array that produces electricity from the laser or other visible light source. In another aspect, beam source 202 emits microwaves, and power receiver 208 is a rectenna. Alternative embodiments may include any suitable power receiver 208, including, but not limited to, quantum dot solar cells, or thermal energy receivers that power heat engines inside unmanned vehicle 206. For example, in one embodiment, a thermal energy receiver may store energy as heat in a thermal energy storage system. As such, in different embodiments, power receiver 208 can receive a desired form of energy from beam source 202 and convert energy from beam 204 into a desired form of energy capable of powering unmanned vehicle 206 to function as described herein.

In the exemplary embodiment, unmanned vehicle 206 includes energy storage system 244. Energy storage system 244 provides energy to enable unmanned vehicle 206 to travel outside of beam 204. As such, energy storage system 244 permits unmanned vehicle 206 to travel from a launch or deployment site towards or away from beam 204. In an exemplary embodiment, energy storage system 244 is coupled to power receiver 208 and is capable of being recharged using energy received by power receiver 208 when unmanned vehicle 206 is in beam 204. Moreover, while unmanned vehicle 206 is positioned within beam 204, energy storage system 244 may be used to satisfy surge power requirements (i.e. brief demands for higher power than beam 204 generally provides) or to continue operation of unmanned vehicle 206 during interruptions of beam 204. In other embodiments, unmanned vehicle 206 uses energy stored in energy storage system 244 to travel away from the beam 204, perform a mission, and navigate itself back to beam 204 before the stored energy is depleted.

In the exemplary embodiment, power receiver 208 is capable of delivering energy to energy storage system 244 in addition to vehicle propulsion system 240, to control system 242, to payload system 246, to navigation system 248, and to position control system 250. In one embodiment, energy storage system 244 includes one or more chemical batteries. In alternative embodiments, energy storage system can include, but is not limited to including, regenerable fuel cells, a flywheel, and/or a thermal storage device.

In the exemplary embodiment, unmanned vehicle 206 includes one or more payload systems 246 that enable unmanned vehicle 206 to perform desired missions. Unmanned vehicle 206 is designed to carry payload system 246 to an intended destination and to support operation of payload system 246 by providing power, thermal control, and/or a stable platform. Payload system 246 could include cameras, small radars, communication relays, sensors, and other similar components for carrying out desired missions.

In the exemplary embodiment, unmanned vehicle 206 includes navigation system 248. Navigation system 248 navigates unmanned vehicle through an environment. In one embodiment, navigation system 248 is configured to navigate unmanned vehicle 206 from a launch site to beam 204. Navigation system 248 may also be configured to navigate unmanned vehicle 206 from beam 204 to a target area and then back to beam 204. Thus, in the exemplary embodiment, navigation system 248 navigates unmanned vehicle 206 from at least one of the launch site, beam 204, and the target area, to another destination.

In the exemplary embodiment, navigation system 248 periodically measures an amount of energy stored in energy storage system 244 and automatically returns unmanned vehicle 206 to beam 204 when the available energy drops below a pre-defined threshold. In the exemplary embodiment, navigation system 248 also includes a navigation computer 260. A user can configure navigation computer 260 with GPS coordinates of beam 204, or more specifically, with the region of intensity of beam 204. Accordingly, navigation system 248 may use navigation computer 260 to navigate unmanned vehicle 206 to beam 204 using the GPS signals as a reference.

In the exemplary embodiment, navigation system 248 also includes a remote control system 262 that enables a user to remotely direct unmanned vehicle 206 to the beam 204. In the exemplary embodiment, unmanned vehicle 206 also navigates using visual cues detected by a camera 264 and a corresponding image processing system 266. Such visual cues may include flashing lights, object features, or other navigational aids that are adjacent to beam source 202. In another embodiment, navigation system 248 permits unmanned vehicle 206 to navigate using a radio signal emitted by beam source 202.

In the exemplary embodiment, unmanned vehicle 206 includes position control system 250. Position control system 250 enables precise movements of unmanned vehicle 206 that may not be possible using navigation system 248. For example, in one aspect, when beam 204 is relatively narrow, navigation system 248, using GPS alone, may not be precise enough to keep unmanned vehicle 206 centered in beam 204. More specifically, when beam 204 is relatively narrow and/or power receiver 208 is relatively small, a relatively small position error may cause power receiver 208 to receive less than a nominal amount of power from beam 204. In contrast to using GPS, position control system 250 may enable fine positioning of unmanned vehicle 206 relative to beam 204. Position control system 250 may also enable fine adjustments for position stability within beam 204, thus enabling unmanned vehicle 206 to hover within beam 204 and facilitating receiving the maximum available power from beam 204.

In the exemplary embodiment, position control system 250 measures a power output of power receiver 208. While making small excursions about a mean position of unmanned vehicle 206 with respect to beam 204, position control system 250 measures the power output and the position at which each measurement was made. Position control system 250 correlates this data with a model of the intensity profile of beam 204 to estimate a location of "maximum" beam intensity.

Position control system 250 is also configured to position unmanned vehicle 206 near the estimated location to facilitate maximizing power being received by power receiver 208.

Further, in embodiments where beam source 202 is mounted to a moving vehicle, position control system 250 may be configured to associate each power output measurement with a time as well as a position, such that the velocity at which beam source 202 is moving can be calculated. This configuration enables unmanned vehicle 206 to remain substantially centered in beam 204, even when beam source 202 is mounted on a moving boat, pickup truck, or other vehicle. This enables unmanned vehicle 206 to operate in a variety of situations. For example, unmanned vehicle 206 could provide a continuous airborne relay or aerial surveillance for a moving convoy of vehicles.

In the exemplary embodiment, position control system 250 includes an inertial measurement unit (IMU) 270. IMU 270 enables unmanned vehicle 206 to remain at a given position and attitude despite disruptive events, such as gusts of wind or fluctuations in power. In the exemplary embodiment, position control system 250 also includes one or more sensors 272 that measure a position of unmanned vehicle 206 relative to one or more known features of beam source 202. In one embodiment, sensor 272 includes a camera 264 that detects naturally occurring or augmented object features, such as painted marks. Camera 264 can also detect optical beacons that flash at known frequencies, such as infrared light-emitting diode blinkers. In the exemplary embodiment, camera 264 performs mission operations as part of payload system 246, and aids in navigation as part of navigation system 248, in addition to measuring the position of unmanned vehicle 206 as part of position control system 250. Alternatively, separate cameras could be utilized for each system (not shown).

Figure 5:
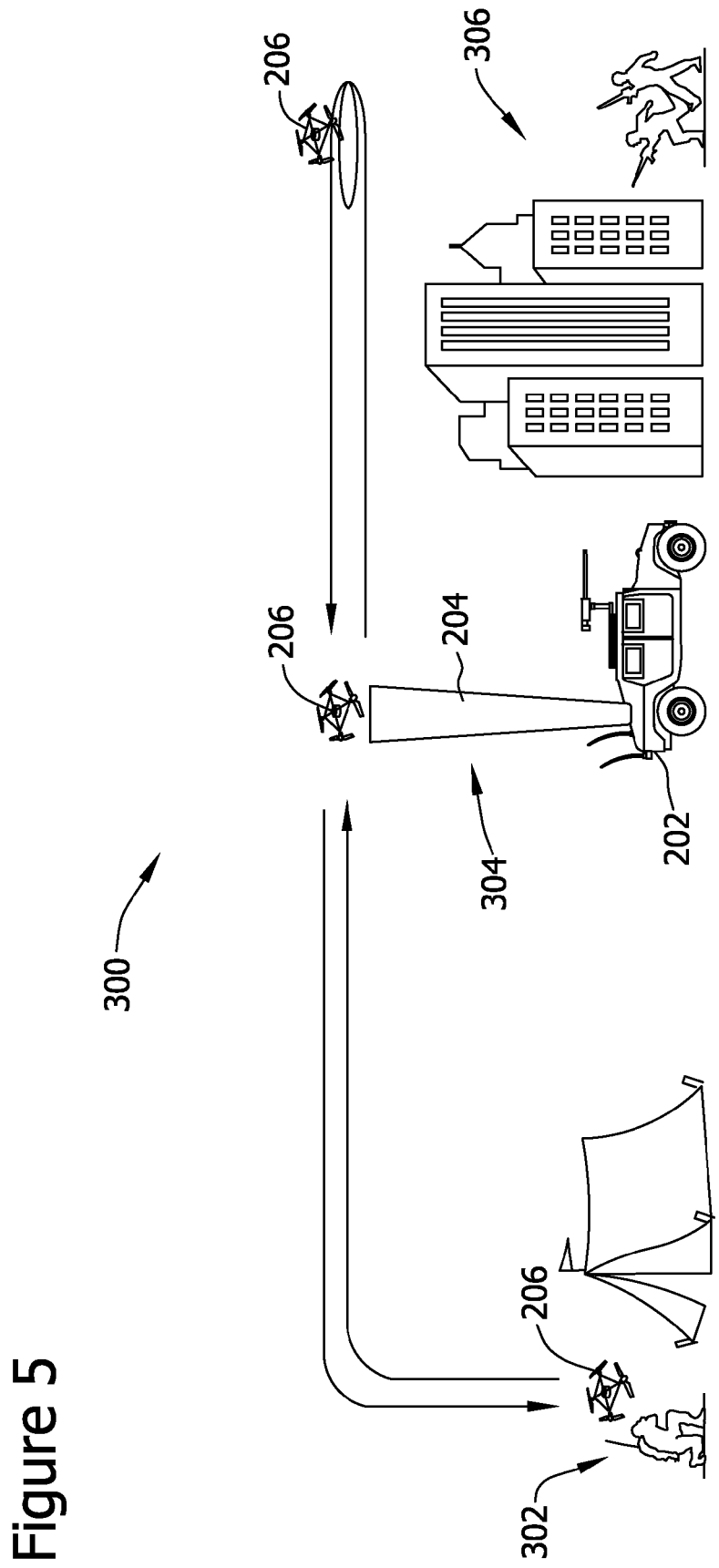
FIG. 5 is a diagram showing an exemplary use of an exemplary beamed power system, such as the beamed power system shown in FIG. 2.

FIG. 5 is a diagram 300 showing an exemplary use of an exemplary beamed power system, such as beamed power system 200 shown in FIG. 2. In the exemplary embodiment, unmanned vehicle 206 launches from a launch and maintenance area 302. Using navigation system 248, unmanned vehicle 206 navigates to beam 204 at an unmanned vehicle recharge area 304. Position control system 250 ensures that unmanned vehicle 206 is substantially centered within beam 204. When unmanned vehicle 206 is sufficiently charged, navigation system 248 navigates unmanned vehicle 206 to an area of interest 306. Unmanned vehicle 206, using payload system 246, carries out a mission at the area of interest 306. When the mission is completed or the remaining power of unmanned vehicle 206 drops below a pre-determined threshold, unmanned vehicle returns to unmanned vehicle recharge area 304. Once unmanned vehicle 206 has received sufficient power from beam 204, unmanned vehicle can travel to launch and maintenance area 302, area of interest 306, or another target area, as desired. Those skilled in the art will understand that the beamed power system 200, as described, enables unmanned vehicle 206 to navigate from one of launch and maintenance area 302, unmanned vehicle recharge area 304, and area of interest 306, to another desired area, in various sequences.

As compared to known unmanned vehicles and vehicle systems, the unmanned vehicle and vehicle system described herein enable the unmanned vehicle to conduct a variety of missions because the unmanned vehicle includes a navigation system for navigating the unmanned vehicle relative to the beam source. Moreover, the beam source described herein is more inexpensive and easier to manufacture than known beam sources because it does not require complicated electrical and mechanical systems for manipulating the direction of the emitted beam.

The systems described herein facilitate decreasing the cost, weight, vulnerability, complexity, and maintenance requirements of beamed power systems, as well as increasing mission availability and mission duration for unmanned vehicles. The systems described herein also eliminate the need for beam steering and control systems, and enable an unmanned vehicle to operate outside of a beam. Moreover, the embodiments described herein enable an unmanned vehicle to move to perform a wide range of useful missions. The embodiments described herein also permit a beam source to be mounted and operated from many different platforms and in many different environments.

The systems described herein may be implemented or performed using one or more computers or computing devices. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of computer readable media.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An unmanned vehicle comprising:
    a navigation system configured to navigate said unmanned vehicle relative to a beam of energy emitted from a beam source;
    a power receiver configured to receive energy from the beam;
    an energy storage system configured to store received energy for use in selectively powering said unmanned vehicle; and
    a position control system configured to measure a power output of said power receiver, and a time associated with each power output measurement, and enable said unmanned vehicle to be finely positioned.

2. An unmanned vehicle in accordance with claim 1, wherein said unmanned vehicle is an unmanned aerial vehicle (UAV).

3. An unmanned vehicle in accordance with claim 1 further comprising a vehicle propulsion system configured to propel said unmanned vehicle, said vehicle propulsion system comprising at least one motor and at least one positioning device.

4. An unmanned vehicle in accordance with claim 1 further comprising:
    a control system; and a vehicle propulsion system, said control system configured to control a position of said unmanned vehicle using said vehicle propulsion system.

5. An unmanned vehicle in accordance with claim 4, wherein said control system comprises a power management and distribution system for use in selectively allocating power to said unmanned vehicle.

6. An unmanned vehicle in accordance with claim 1, wherein said power receiver comprises at least one of a photovoltaic array and a rectenna.

7. An unmanned vehicle in accordance with claim 1, wherein said navigation system is further configured to:
measure an amount of energy stored in said energy storage system; and
guide said unmanned vehicle to the beam of energy when the energy stored is below a pre-determined threshold.

8. An unmanned vehicle in accordance with claim 1, wherein said navigation system is further configured to utilize at least one of global positioning system (GPS) coordinates, visual cues, and radio signals, to navigate said unmanned vehicle.

9. An unmanned vehicle in accordance with claim 1, wherein said position control system comprises an inertial measurement unit and at least one sensor configured to measure a relative position of said unmanned vehicle.

10. An unmanned vehicle in accordance with claim 9, wherein said at least one sensor comprises a camera configured to detect at least one of object features and optical beacons.

11. A vehicle system comprising:
a beam source configured to emit a beam of energy, said beam source comprising a position reference system that comprises at least one of a local reference signal and a set of object features visible to a camera coupled to said unmanned vehicle, said position reference system configured to substantially center said unmanned vehicle relative to said beam; and
an unmanned vehicle comprising a navigation system, a power receiver, and an energy storage system, said navigation system configured to position said unmanned vehicle relative to the beam, said power receiver configured to receive energy from the beam, said energy storage system configured to store received energy for use in powering said unmanned vehicle.

12. A system in accordance with claim 11, wherein said beam source comprises a locating system configured to aid said unmanned vehicle in locating the beam.

13. A system in accordance with claim 12, wherein said locating system comprises a global positioning system (GPS).

14. A system in accordance with claim 11, wherein said beam source comprises a proximity activation system, said beam source activated when said unmanned vehicle is within a predefined distance from said beam source.

15. A system in accordance with claim 14, wherein said proximity activation system comprises at least one of an acoustic sensor configured to recognize a sound emitted by said unmanned vehicle, a visual sensor configured to recognize an appearance of said unmanned vehicle, and a radio configured to receive positional data from said unmanned vehicle.

16. An unmanned vehicle comprising:
a navigation system configured to navigate said unmanned vehicle relative to a beam of energy emitted from a beam source;
a power receiver configured to receive energy from the beam;
an energy storage system configured to store received energy for use in selectively powering said unmanned vehicle; and
a position control system comprising an inertial measurement unit and at least one sensor configured to measure a relative position of said unmanned vehicle, said at least one sensor comprising a camera configured to detect at least one of object features and optical beacons, said position control system configured to enable said unmanned vehicle to be finely positioned.

17. A vehicle system comprising:
a beam source configured to emit a beam of energy, said beam source comprising a proximity activation system that comprises at least one of an acoustic sensor configured to recognize a sound emitted by said unmanned vehicle, a visual sensor configured to recognize an appearance of said unmanned vehicle, and a radio configured to receive positional data from said unmanned vehicle; and
an unmanned vehicle comprising a navigation system, a power receiver, and an energy storage system, said navigation system configured to position said unmanned vehicle relative to the beam, said power receiver configured to receive energy from the beam, said energy storage system configured to store received energy for use in powering said unmanned vehicle, wherein said beam source is activated when said unmanned vehicle is within a predefined distance from said beam source.

* * * * *